US007894626B2

(12) United States Patent
Wang et al.

(10) Patent No.: US 7,894,626 B2
(45) Date of Patent: Feb. 22, 2011

(54) SYSTEM AND METHOD FOR THE GENERATION OF MULTIPLE ANGLE CORRELATION-BASED DIGITAL WATERMARKS

(75) Inventors: Shen-Ge Wang, Fairport, NY (US); Robert J. Rolleston, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 837 days.

(21) Appl. No.: 11/848,908

(22) Filed: Aug. 31, 2007

(65) Prior Publication Data
US 2009/0060258 A1 Mar. 5, 2009

(51) Int. Cl.
*G06K 9/00* (2006.01)
(52) U.S. Cl. .......................................... 382/100; 713/176
(58) Field of Classification Search ................. 382/100, 382/232; 380/54, 210, 252, 287; 713/176; 704/200.1, 273; 381/73.1; 348/460, 463
See application file for complete search history.

(56) References Cited

U.S. PATENT DOCUMENTS

| 4,149,183 | A |   | 4/1979 | Pellar et al. |
| 4,196,451 | A |   | 4/1980 | Pellar |
| 5,537,223 | A | * | 7/1996 | Curry ........................ 358/3.28 |
| 6,252,971 | B1 | * | 6/2001 | Wang ......................... 382/100 |
| 6,614,914 | B1 | * | 9/2003 | Rhoads et al. .............. 382/100 |
| 6,798,539 | B1 |   | 9/2004 | Wang et al. |
| 2006/0120557 | A1 | * | 6/2006 | Wang ......................... 382/100 |
| 2008/0019559 | A1 | * | 1/2008 | Wang et al. ................. 382/100 |

* cited by examiner

*Primary Examiner*—Anand Bhatnagar
(74) *Attorney, Agent, or Firm*—Fay Sharpe LLP

(57) ABSTRACT

Disclosed are systems and methods directed to the generation of digitally watermarked grayscale images having a watermark embedded at different arbitrary Rotation Angles. A single public key can be used to retrieve the otherwise invisible watermarks from the watermarked images when overlaid atop the images at Orientation Angles corresponding to the Rotation Angles.

19 Claims, 10 Drawing Sheets

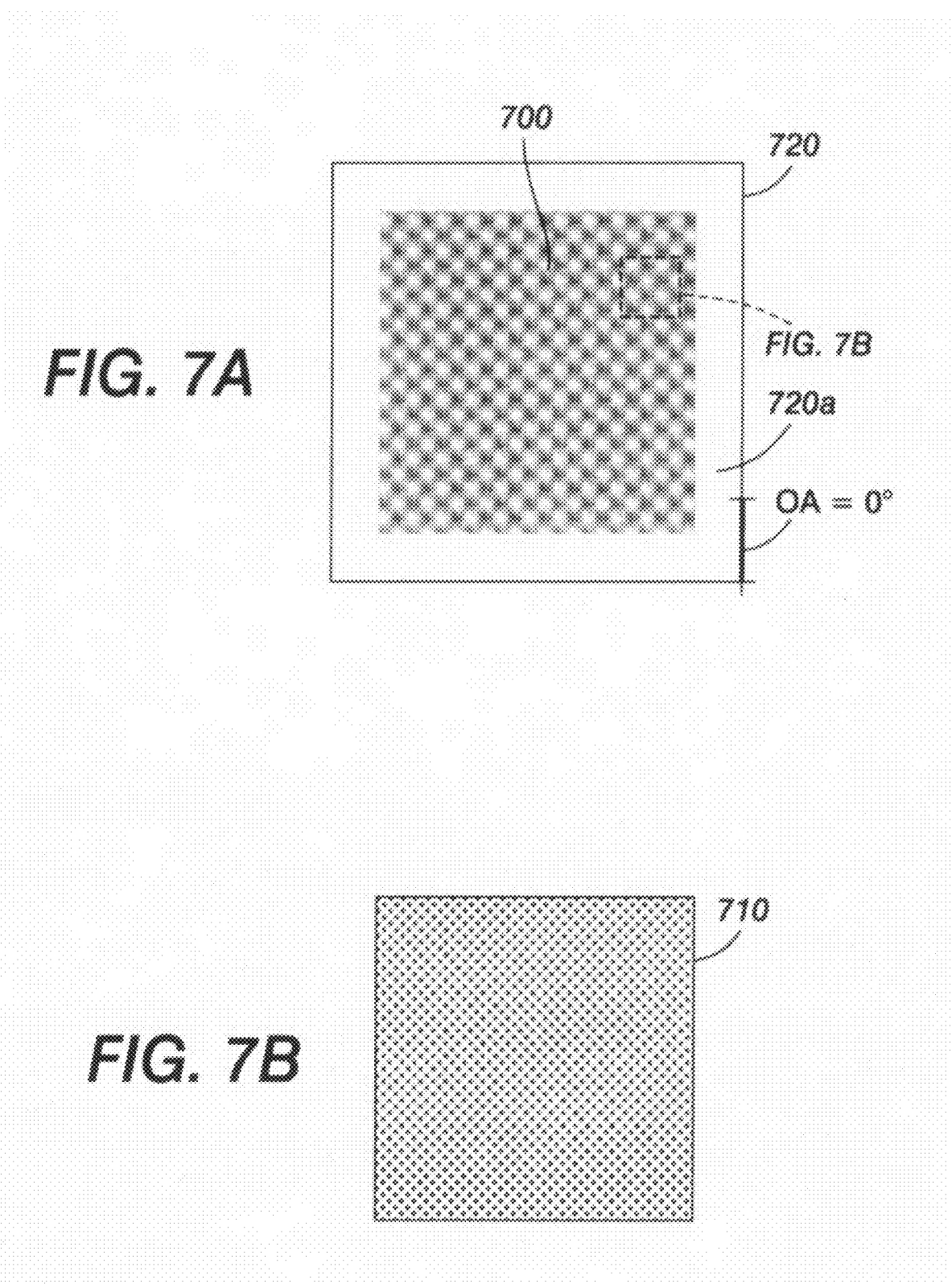

SYSTEM AND METHOD FOR THE GENERATION OF MULTIPLE ANGLE CORRELATION-BASED DIGITAL WATERMARKS

CROSS-REFERENCE TO COPENDING APPLICATIONS

Attention is directed to co-pending applications filed concurrently herewith: U.S. Publication No. 2009/0060261, entitled "SYSTEM AND METHOD FOR THE GENERATION OF CORRELATION-BASED DIGITAL WATERMARKS"; and U.S. Publication No. 2009/0060262 entitled "SYSTEM AND METHOD FOR THE GENERATION OF MULTI-LAYER CORRELATION-BASED DIGITAL WATERMARKS" the disclosure found in these co-pending applications are hereby incorporated herein by reference in its entirety. The appropriate components and processes of the above co-pending applications may be selected for the teaching and support of the present application in embodiments thereof.

BACKGROUND AND SUMMARY

Disclosed in embodiments herein are methods and systems for generation of separate gray-scale watermarked images having watermarks that can be retrieved, or viewed, using the same public key rotated to different orientation angles.

The basics of phase-shift based digital watermarks, or correlation-marks, are described in U.S. Pat. No. 6,252,971 for "Digital watermarking using phase-shift stoclustic screens," by S. Wang, previously incorporated herein by reference. Briefly, if two similar cluster halftone patterns are superimposed on each other, the output appearances can differ significantly depending on the relative positions, or the phase shift, of the two patterns. For example, the two checkerboard patterns, 100 depicted in FIGS. 1A and 110 depicted in FIG. 1B, are essentially the same, except that the pattern 110 in FIG. 1B is a shifted version of the pattern 110 in FIG. 1A with an exactly "one-box width" shift. If the two patterns 100 and 110 are superimposed on each other with a perfect alignment, the result would be a completely black image as depicted by 120 in FIG. 1D. On the other hand, overlapping pattern 100 of FIG. 1A with itself, which can be considered another version of 100 with a zero-shift, gives an identical pattern to the original pattern 100, as depicted by 130 in FIG. 1C.

Referring now to FIGS. 2A-2C, a halftone pattern is shown at 200 having only it's central portion, shown as region 210, shifted in this manner. When the reference, or "public key", represented by the halftone pattern 240 of FIG. 2B is overlaid on top of the pattern 200, the result is clearly visible as a black central region shown at 250 in FIG. 2C. The example depicted in FIGS. 2A-2C is a simple demonstration for the phase-shift digital watermark technique. The shifted central part 210 in the picture may be considered as a square watermark, which is retrieved as a black square 250 in the overlay shown in FIG. 2C. The shift required for an optimal retrieval is equal to a half period of the halftone structure, or π, in a general mathematic term. The problem with a simple "insertion", however, is that the boundaries between the shifted portion 210 and the balance of the image are quite visible as a seam 220 shown in FIG. 2A. To hide the seam 220, the phase jump from zero to π should be replaced by a smooth phase transition.

Prior patents, such as U.S. Pat. No. 6,252,971 for "Digital watermarking using phase-shift stoclustic screens," by S. Wang, hereby incorporated herein by reference in its entirety, describe a method to embed correlation-based phase-shift digital watermarks, also referred to a correlation marks, into halftone screens. By overlaying a transparency on the prints generated by the special halftone screen, for example as a public key, an invisible watermark embedded in the image can be retrieved.

An aspect of the disclosed system and method provided extends use and formation of correlation marks by enabling separate watermarked images to be formed by embedding a phase shifted watermark into an image by halftoning the image with the three-dimensional threshold array where at least one input thereto is a phase shift value using a halftone structure having a plurality of different, arbitrary Rotation Angles. The same public key, in the form of a transparency, can be used to retrieve the watermark from all of the images when overlaid atop each image at an Orientation Angle matching the Rotation Angle used for embedding the watermark in the image.

Disclosed in embodiments herein is a method for digital watermarking of a grayscale image, including receiving the grayscale image to be watermarked, determining the grayscale watermark to be embedded in the image, and creating a plurality of digital watermarked grayscale images by embedding a digital watermark into the image by halftoning the image with a three-dimensional threshold array where at least one input thereto is a phase shift value using a halftone structure defined by the spatial vectors $V_a(x_a, y_a)$ and $V_b(x_b, y_b)$ having the same interior angle α (the angle between the two vectors $V_a$ and $V_b$), the same vector amplitude D, and a different Rotation Angle for each.

Disclosed in embodiments herein is a method for retrieving a watermark image from a plurality of digitally watermarked grayscale images, each formed by halftoning an image with a halftone structure having a different arbitrary Rotation Angle using a three-dimensional threshold array having phase shift value as an input, including overlaying a single public key transparency of a checkerboard pattern having halftone frequencies and angles matching the halftone structure used for forming the plurality of digital watermarked grayscale images atop each of the watermarked images and orienting the key with respect to the watermarked images at Orientation Angles matching the Rotation Angles used for embedding the watermark image into the corresponding digitally watermarked image to retrieve the watermark image.

Also disclosed in embodiments herein is a system for producing digital watermarked images including an input image source, image memory for storing the input image to be watermarked, watermark memory for storing the watermark to be embedded in the image, and an image processor including a three-dimensional threshold array where at least one input thereto is a phase shift value for embedding an invisible digital watermark into the image by halftoning the image with the three-dimensional threshold array using a plurality of halftone structures each defined by the spatial vectors $V_a(x_a, y_a)$ and $V_b(x_b, y_b)$ having the same interior angle α, the same vector amplitude D, and a different Rotation Angle to produce a plurality of digitally watermarked output images.

BRIEF DESCRIPTION OF THE DRAWINGS

FIGS. 7A and 7B is an example of a public key screen that may be used to detect the watermarks in the images of FIG. 6;

The various embodiments described herein are not intended to limit the invention to those embodiments described. On the contrary, the intent is to cover all alternatives, modifications, and equivalents as may be included within the spirit and scope of the invention as defined by the appended claims.

DETAILED DESCRIPTION

As more particularly set forth below, the disclosed system and methods are directed to the generation of digital watermarks, including generating separate gray-scale watermarked images using halftone structures with different Rotation Angles, such that the watermarks may be retrieved, or viewed, using the same public key overlaid atop the images at different Orientation Angles.

Figure 1A:
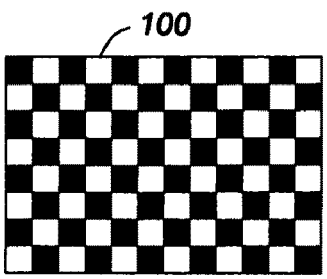
FIGS. 1A and 1B are exemplary representations of halftone patterns and FIGS. 1C and 1D illustrate the effect achieved by overlaying the patterns of FIGS. 1A and 1B.
Figure 1B:
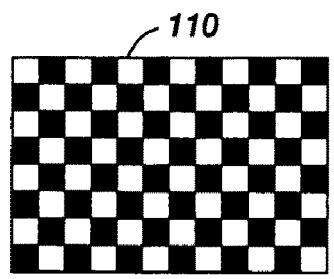
Figure 1C:
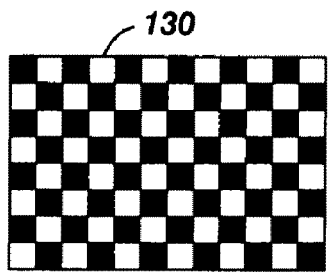
Figure 1D:
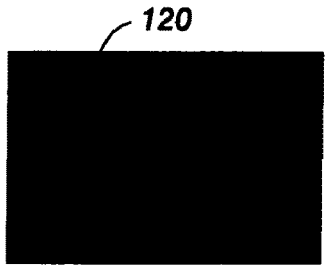
Figure 2A:
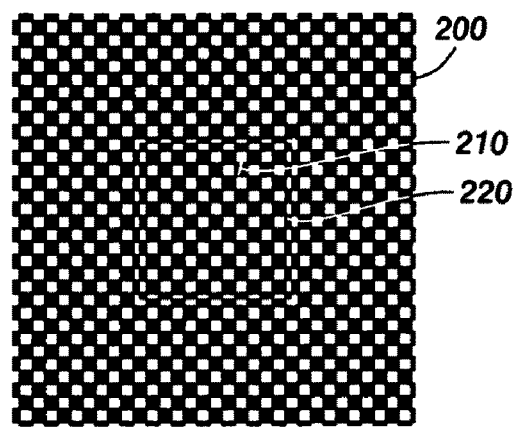
FIGS. 2A-2C are exemplary representations of an aspect of embodiments in the present invention showing the phase shifting of only a portion of a halftone image.
Figure 2B:
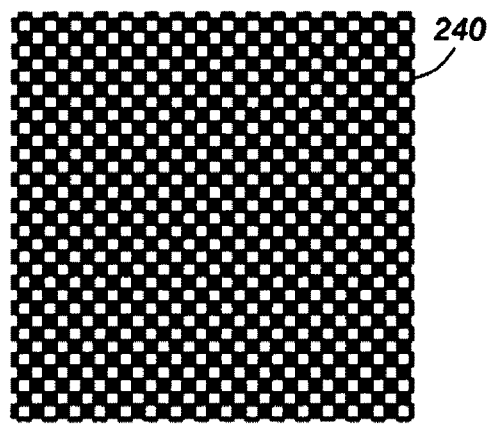
Figure 2C:
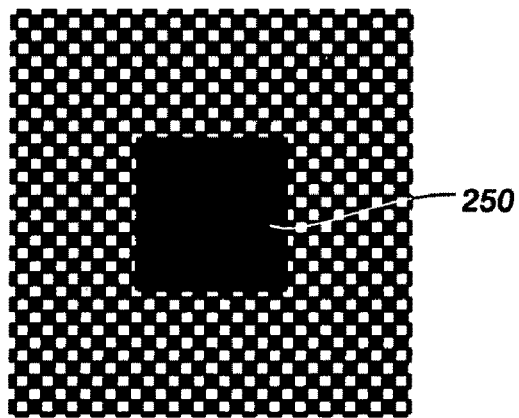
Figure 3A:
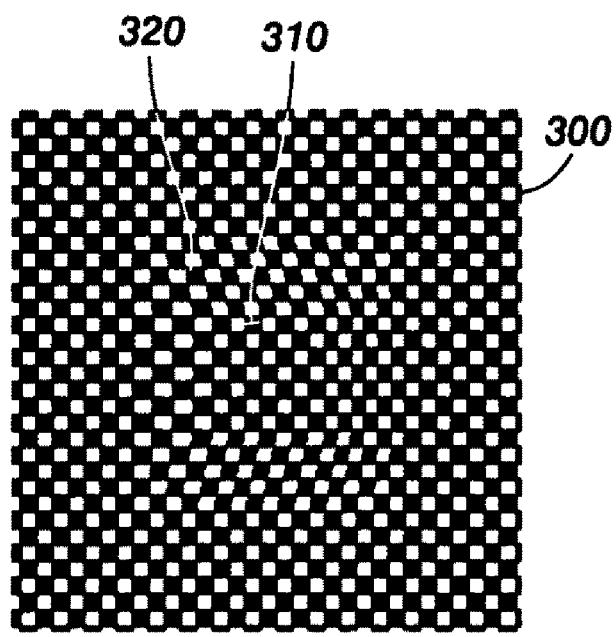
FIGS. 3A and 3B are representative examples of images processed in accordance with an aspect of the disclosed invention.
Figure 3B:
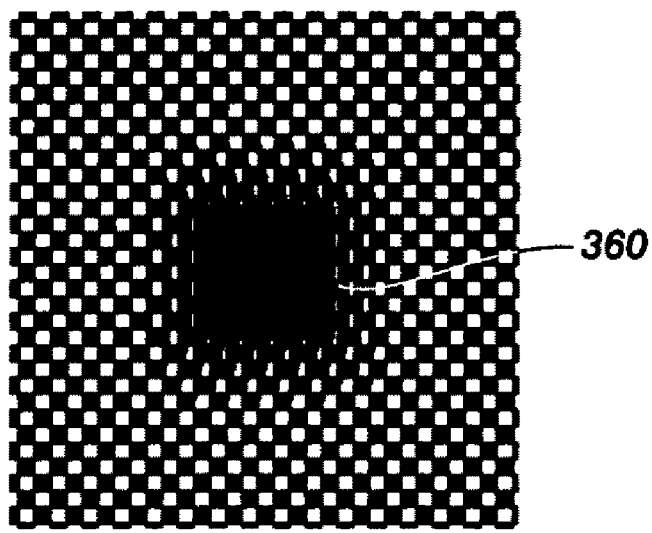

A smooth phase transition between 0 and $\pi$ for the region 210 of FIG. 2A can be achieved by using a three-dimensional threshold array as disclosed by the above-referenced co-pending applications filed concurrently herewith: U.S. Publication No. 2009/0060261, and U.S. Publication No. 2009/0060262 previously incorporated herein by reference. The halftone output with the embedded watermark pattern looks like the halftone pattern 300 shown in FIG. 3A. The boundary or seam 320 between the phased shifted central region 310 and the balance of the image is much less visible than the seam 220 in FIG. 2A. When a reference key, such as the pattern 240 of FIG. 2B is placed atop the halftone pattern 300 of FIG. 3A, a somewhat blurred square, such as depicted in region 360 in FIG. 3B, will be retrieved as the digital watermark.

Unlike conventional halftoning techniques, the threshold value for a particular pixel is not chosen from a halftone screen based solely on the spatial coordinates, x and y, of the pixel, but rather the digital watermark embedding method uses a three-dimensional threshold array with an additional dimension specified by the phase shift, or more particularly the phase shift relative to an initial zero-shift halftone screen. During the halftone process, the threshold value for each pixel is chosen from the three-dimensional array (e.g., array 952 in FIG. 9) by specifying the spatial coordinates x and y, as well as a desired phase shift s. In the following discussion T(x, y, s) is employed to represent the halftone threshold value as a function of variables x, y and s.

Figure 4:
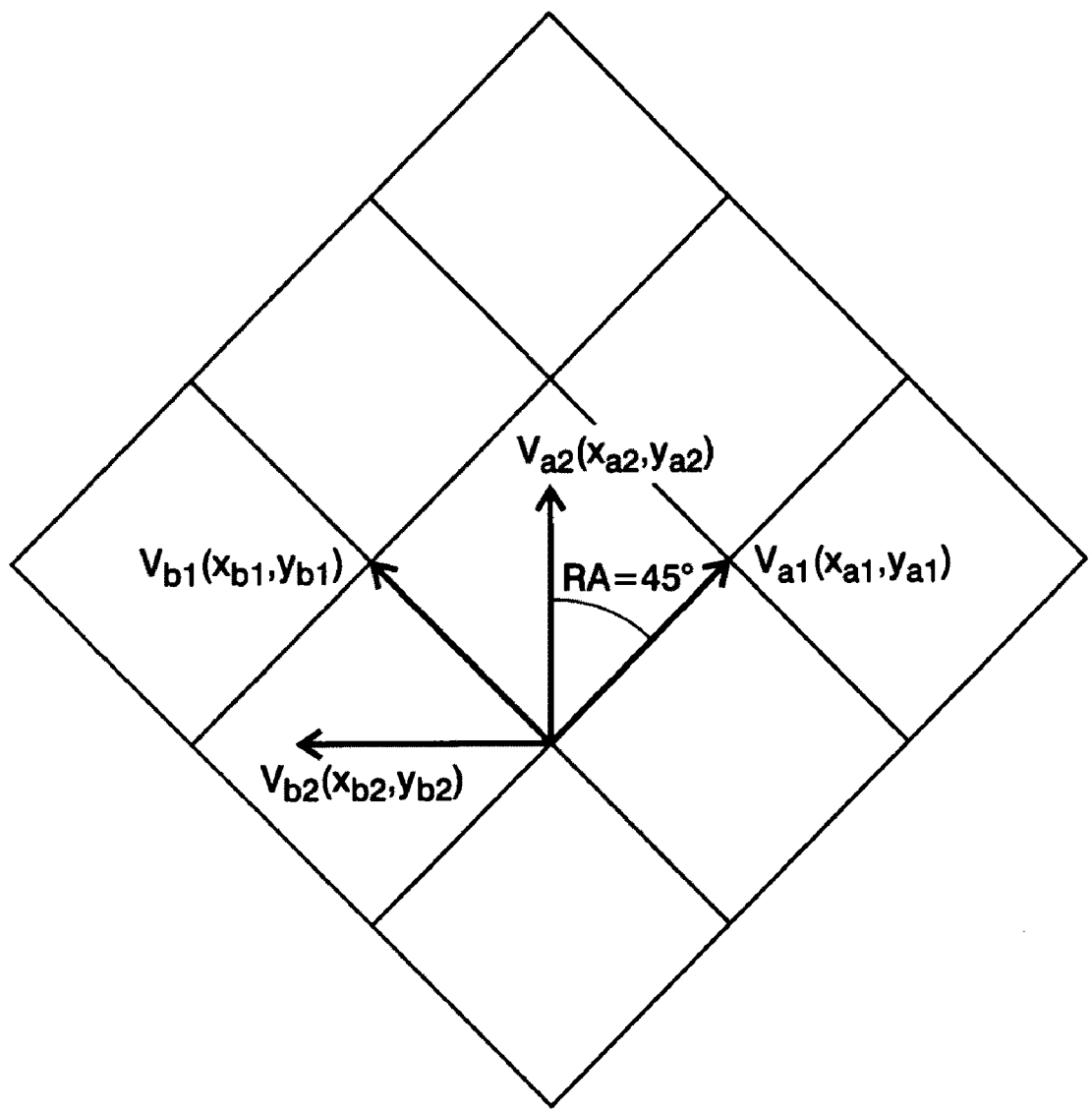
FIG. 4 is a vectorized representation of the geometry of a cluster screen used in accordance with the disclosed system and method.

Referring now to FIG. 4, using a vector notation, the geometry of a cluster screen can be specified by two spatial vectors, $V_a(x_a, y_a)$ and $V_b(x_b, y_b)$, as shown at in FIG. 4. As an example, a 45 degree, 106 line-per-inch (LPI) cluster screen for a 600 dot-per-inch (DPI) printer can be represented by two vectors, $V_a(4, 4)$ and $V_b(-4, 4)$.

For halftoning images specified by 8 bits, or gray levels between 0 to 255, a common design of the two-dimensional threshold array with a given cluster geometry can be described mathematically as $$T(x,y)=128-127\cdot\{\cos[k\pi(x\cdot y_a+y\cdot x_a)]+\cos[k\pi(x\cdot y_b+y\cdot x_b)]\}/2, \quad (1)$$

where k is a scaling factor constant.

The equation, sometimes referred to as the dot profile, provides round-dot or round-hole shapes for the halftone outputs in the high light or the shadow part of an image, and checkerboard-like patterns for the middle tones. The dot profile T(x, y) in Equation 1 is used as the initial zero-shift halftone screen, or T(x, y, 0). The three-dimensional threshold array, which is also a function of the phase shift used for watermark embedding, can be obtained by using a slight modification of Equation 1, and expressed as $$T(x,y)=128-127\cdot\{\cos[k\pi(x\cdot y_a+y\cdot x_a)+s]+\cos[k\pi(x\cdot y_b+y\cdot x_b)+s]\}/2, \quad (2)$$

where s is the phase shift in radians.

The resolution of the phase shift depends on the application. In general, a higher resolution provides better watermark hiding but requires larger memory space to store the three-dimensional array. Practically, for most applications it is possible choose N, the number of steps for a linear phase transition from zero to $\pi$, equal to 255. Therefore, it is possible to interpret the gray-levels in terms of desired phase shift. To embed a black/white watermark into halftone images, a $\pi$ shift for all the black areas and no shift for the white background is needed. Consider using 0 for the white and 255 for a complete black, we may interpret the white, or the gray level 0, as a zero phase shift and the complete black, or the gray level 255, as a $\pi$ phase shift. In other words, $$s=g\cdot\pi/N, \quad (3)$$

where g is the gray level, N=255 is the total number of gray levels and s is the phase shift. As will be appreciated, a smooth phase transition may be necessary to hide seams caused by the imposition of the watermark image.

Figure 5A:
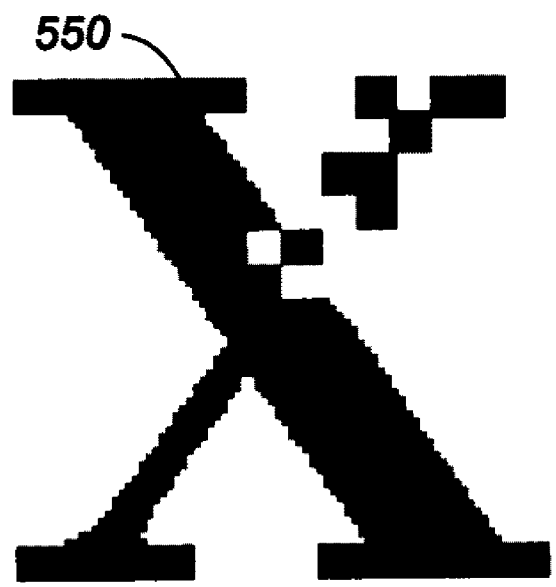
FIGS. 5A and 5B are representative illustrations of watermark images.
Figure 5B:
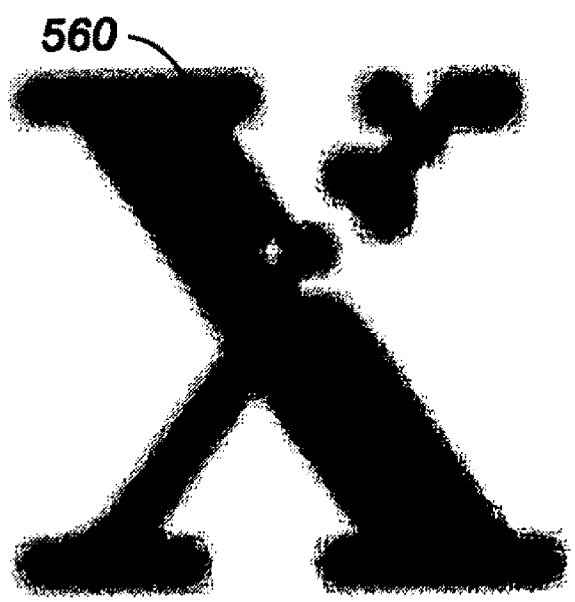

Referring to FIGS. 5A and 5B, the desired phase transition can be represented by a blurred watermark image as shown at 560 in FIG. 5B, which may be produced from the original bi-level watermark image shown at 550 in FIG. 5A, wherein all gray levels between 0 and 255 in the blurred image can be interpreted as intermediate steps between phase zero and phase $\pi$. The blurring process may be conducted using well-known low-pass filtering methods. The proper low-pass filters used in the process can be determined in practice by balancing the watermark hiding effect and the contrast of retrieved watermarks. Experimental results suggest that the area of the low-pass filter should be large enough to cover a plurality of clusters, more particularly at least about ten clusters, to provide a satisfactory result.

As described above, in reference to FIG. 4, the geometry of a cluster halftone structure used for embedding the phase shifted digital watermark is described by the two spatial vectors, $V_a(x_a, y_a)$ and $V_b(x_b, y_b)$ which can be referred to as the first halftone structure $V_{a1}(x_{a1}, y_{a1})$ and $V_{b1}(x_{b1}, y_{b1})$ shown at 402. It has further been found, that a plurality of different cluster halftone structures can be generated by rotating the halftone structure defined by these spatial vectors to a plurality of different, arbitrary Rotation Angles, referred to generally as $RA_1$-$RA_n$ while keeping the interior angle between the vectors and the vector amplitudes the same. For halftone screens with a 90 degree interior angle ($\alpha$), and an equal vector amplitude, the rotation angles (RA) may vary between 0 and 90 degrees. An example of a second cluster halftone structure described by two spatial vectors $V_{a2}(x_{a2}, y_{a2})$ and $V_{b2}(x_{b2}, y_{b2})$ that can also be used for embedding the phase shifted digital watermark is shown at 404 in FIG. 4. This second halftone structure 404 has a Rotation Angle of 45 degrees (RA=45°) with respect to the first halftone structure 402, as shown. The Rotation Angle (RA) is equal to the angle between a vector of the first halftone structure, such as $V_{a1}(x_{a1}, y_{a1})$ or $V_{b1}(x_{b1}, y_{b1})$, and the corresponding vector of the second halftone structure, $V_{a2}(x_{a2}, y_{a2})$ or $V_{b2}(x_{b2}, y_{b2})$ respectively.

The interior angle the interior angle $\alpha_1$ between the two vectors $V_{a1}(x_{a1}, y_{a1})$ and $V_{b1}(x_{b1}, y_{b1})$ of the first halftone structure 402 is equal to the interior angle $\alpha_2$ between the two vectors $V_{a2}(x_{a2}, y_{a2})$ and $V_{b2}(x_{b2}, y_{b2})$ of the second halftone structure 404; 90 degrees in this example. Also, the vector amplitude $|V_{a1}(x_{a1}, y_{a1})|$ of the first vector of the first halftone structure is equal to the vector amplitude $|V_{a2}(x_{a2}, y_{a2})|$ of the first vector of the second halftone structure, and the vector amplitude $|V_{b1}(x_{b1}, y_{b1})|$ of the second vector of the first halftone structure is equal to the vector amplitude $|V_{b2}(x_{a2}, y_{b2})|$ of the second vector of the second halftone structure.

A plurality of these cluster halftone structures, each having a different Rotation Angle (RA), can be used for embedding the phase shifted digital watermark to create a plurality of digital watermarked images. A single public key formed from one of the halftone structures, typically one having a Rotation Angle of zero degrees for simplicity, though others can be used, can be used to retrieve the watermark from all of these watermarked images.

Figure 6:
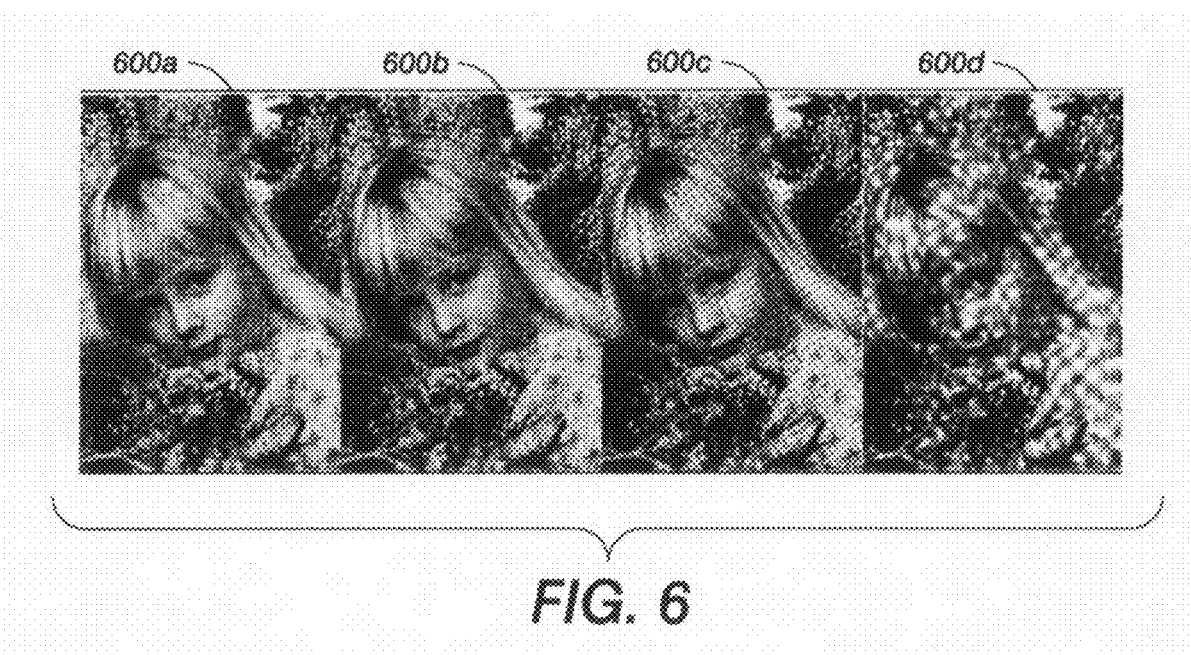
FIG. 6 illustrates watermarked images formed in accordance with the disclosed system and method.

As an example, four of these different halftone structures can each be separately used to embed a digital watermark pattern into an image as described above, to produce four corresponding digitally watermarked images, 600a-600d as shown in FIG. 6. The digital watermark is not visible in the watermarked images 600a-600d unless retrieved by an overlaid public key 700 shown in FIG. 7A. The public key 700 includes a standard checkerboard pattern, shown in close-up at 710 in FIG. 7B, matching the halftone screen used for embedding the watermark. The overlaid public key 700 can be oriented at an angle of rotation, referred to as the Orientation Angle (OA), relative to the watermarked image. In the examples provided below, a frame 720 bordering the public key 700 is used for illustrating the Orientation Angle of the key. The frame 720 includes side portions 720a and the Orientation Angle is illustrated as the angle between the side portion 720a and watermarked image below. In the examples provided herein, the watermarked image 600a-600d is shown in a vertical orientation having zero degrees of rotation. The public key 700 shown in FIG. 7A has an Orientation Angle of zero degrees as shown by the side frame portion 720a extending vertically.

By keeping the vector amplitudes $|V_{an}(x_{an}, y_{an})|$, $|V_{bn}(x_{bn}, y_{bn})|$ of the corresponding vectors $V_{an}(x_{an}, y_{an})$, $V_{bn}(x_{bn}, y_{bn})$ the same and keeping the interior angles between the vectors the same for each halftone structure used for embedding, and using different Rotation Angles (RA) for each halftone structure used for embedding, all of the watermarks can be retrieved using the same public key, also referred to as the single public key 700. The single public key 700 is formed using a matching halftone structure, a checkerboard pattern, described by spatial vectors $V_a(x_a, y_a)$ and $V_b(x_b, y_b)$ having the same vector amplitudes and interior angle. Stated another way, the single public key 700 has the same halftone frequencies and angles of the halftone structure used to embed the watermark image. The watermark embedded in each image 600a-600d is retrieved when the single public key 700 is overlaid on the digitally watermarked image and rotated to an Orientation Angle matching the Rotation Angle RA of the halftone structure used for embedding the watermark.

As an example, which should not be considered limiting, by rotating the above mentioned halftone, a 45 degree, 106 line-per-inch (LPI) cluster screen for a 600 dot-per-inch (DPI) printer represented by the two vectors, $V_a(4, 4)$ and $V_b(-4, 4)$, 45, 32, 15 and 0 degrees, the two vectors $V_{aRA}(x_a, y_a)$ and $V_{bRA}(x_b, y_b)$ become:

$V_{a45}(5.657, 0)$ and $V_{b45}(0, 5.657)$,
$V_{a30}(1.464, 5.464)$ and $V_{b30}(-5.464, 1.464)$,
$V_{a15}(2.828, 4.899)$ and $V_{b15}(-4.899, 2.828)$, and
$V_{a0}(4, 4)$ and $V_{b0}(-4, 4)$, respectively keeping the interior angle $\alpha$ and the vector amplitude the same for each.

The digital watermarks can be embedded into the image by selecting any one of these four configurations for halftoning using the three-dimensional arrays built as discussed above. In retrieval practice, the same public key, defined by the vectors $V_a(4, 4)$ and $V_b(-4, 4)$, can be used for all of them by overlaying the public key transparency on top of the watermarked image and rotating it relative to the image until its Orientation Angle matches the Rotation Angle of the halftone structure used for embedding the watermark image. Creating the public key with a halftone structure having a zero Rotation Angle produces a simple 4×4 checker-board pattern which can be easily reproduced. However, it should be appreciated that the public key can be produced using the halftone structure having any Rotation Angle. Referring now to FIGS. 8A-8D, the four images 600a, 600b, 600c and 600d include the same watermark embedded using the different halftone structures described above.

Watermarked Image 600a includes the mark embedded using the halftone structure with R=45 degrees as defined by $V_{a45}(5.657, 0)$ and $V_{b45}(0, 5.657)$. Watermarked Image 600b includes the mark embedded using the halftone structure with RA=30 degrees as defined by $V_{a30}(1.464, 5.464)$ and $V_{b30}(-5.464, 1.464)$. Watermarked Image 600c includes the mark embedded using the halftone structure with RA=15 degrees as defined by $V_{a15}(2.828, 4.899)$ and $V_{b15}(-4.899, 2.828)$. Watermarked Image 600d includes the mark embedded using the halftone structure with RA=0 degrees as defined by $V_{a0}(4, 4)$ and $V_{b0}(-4, 4)$.

Figure 8A:
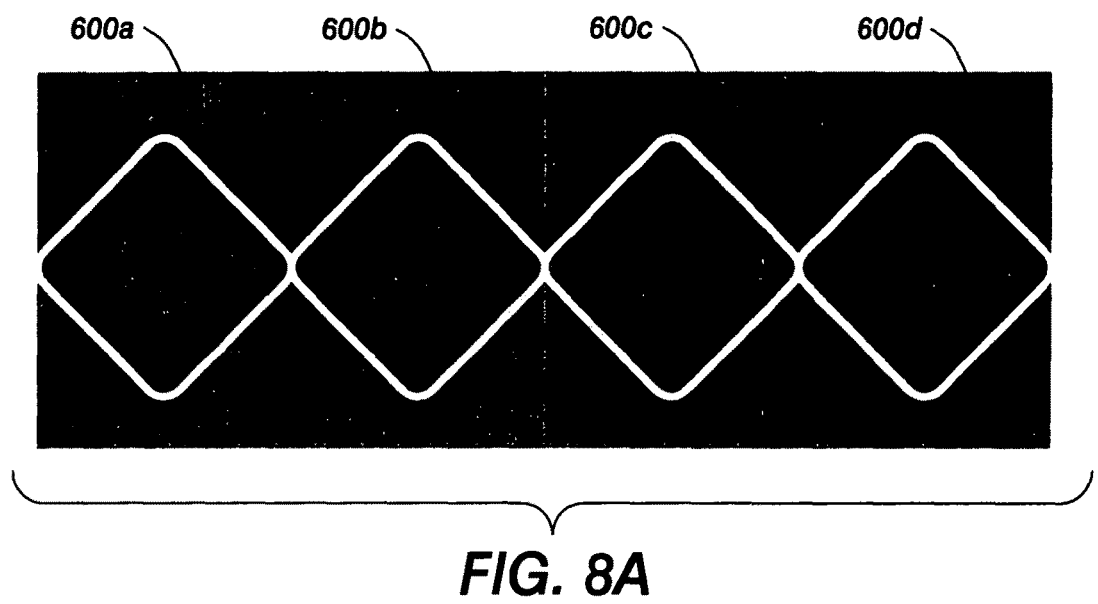
FIGS. 8A-8D are illustrative examples of the resultant retrieval of the mark embedded in FIG. 6.
Figure 8B:
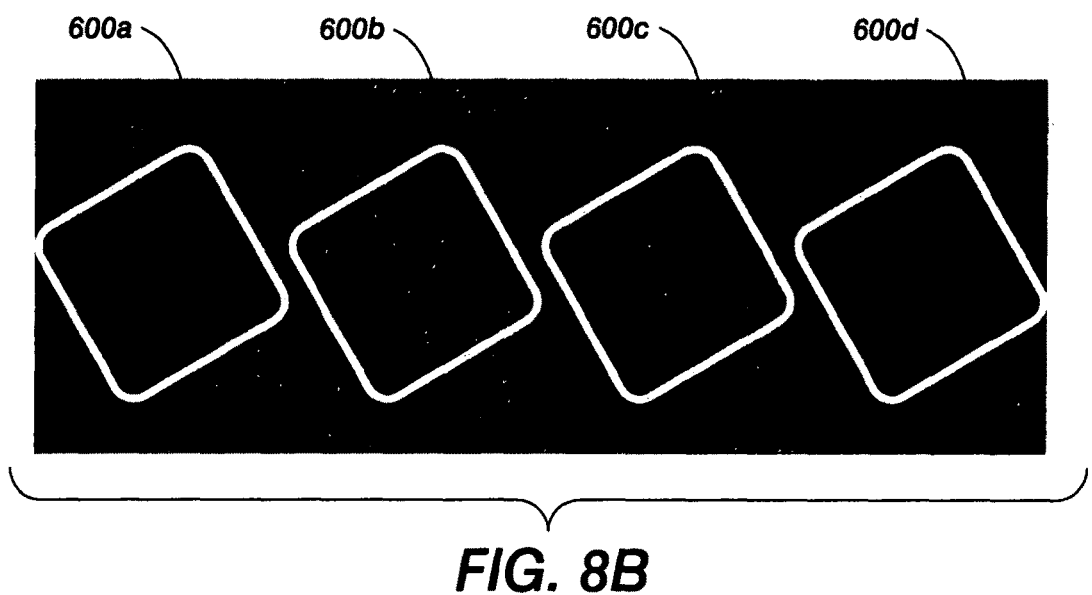
Figure 8C:
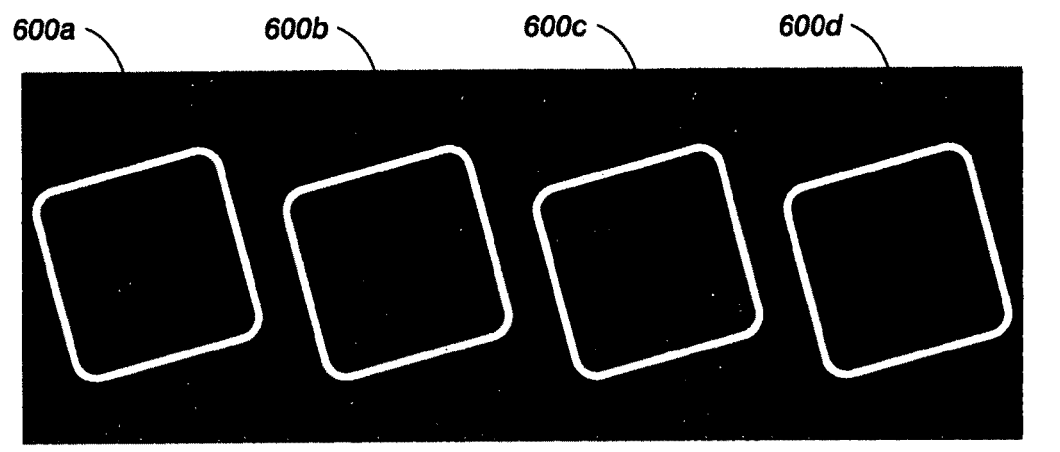
Figure 8D:
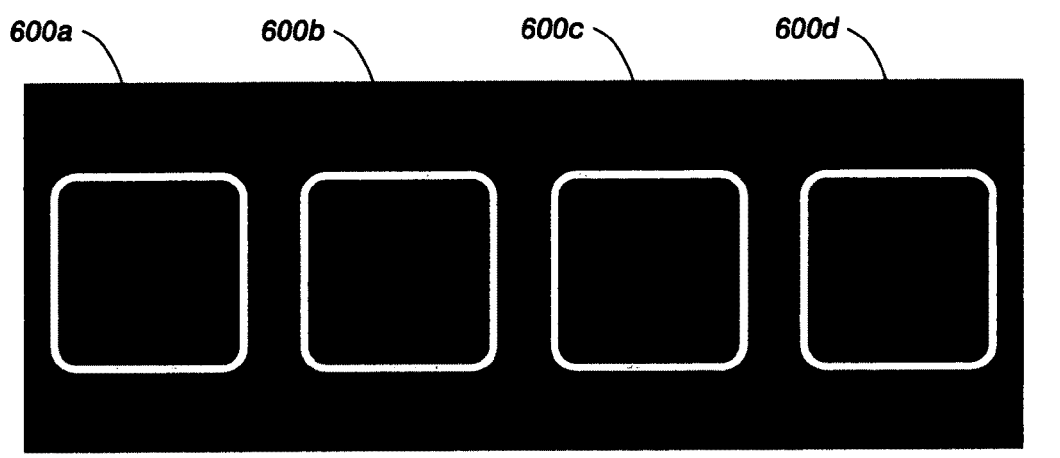

The single public key transparency 700, defined by $V_{a0}(4, 4)$ and $V_{b0}(-4, 4)$, is overlaid atop the images 600a-600d at various Orientation Angles relative to the images below, as illustrated by the angle of side portions 720a of frames 720. In FIG. 8A, the public key 700 is overlaid on each image 600a-600d at an Orientation Angle of 45 degrees which enables only the watermark from image 600a to be retrieved, since it is embedded with the halftone structure having a Rotation Angle of 45 degrees. In FIG. 8B, the public key 700 is overlaid at an Orientation Angle of 30 and only the watermark from image 600b can be retrieved, since it is embedded with the halftone structure having a Rotation Angle of 30 degrees. In FIG. 8C, the public key 700 is overlaid at an Orientation Angle of 15 and only the watermark from image 600c can be retrieved, since it is embedded with the halftone structure having a Rotation Angle of 15 degrees. In FIG. 8D, the public key 700 is overlaid at an Orientation Angle of 0 and only the watermark from image 600d can be retrieved, since it is embedded with the halftone structure having a Rotation Angle of 0 degrees.

Figure 9:
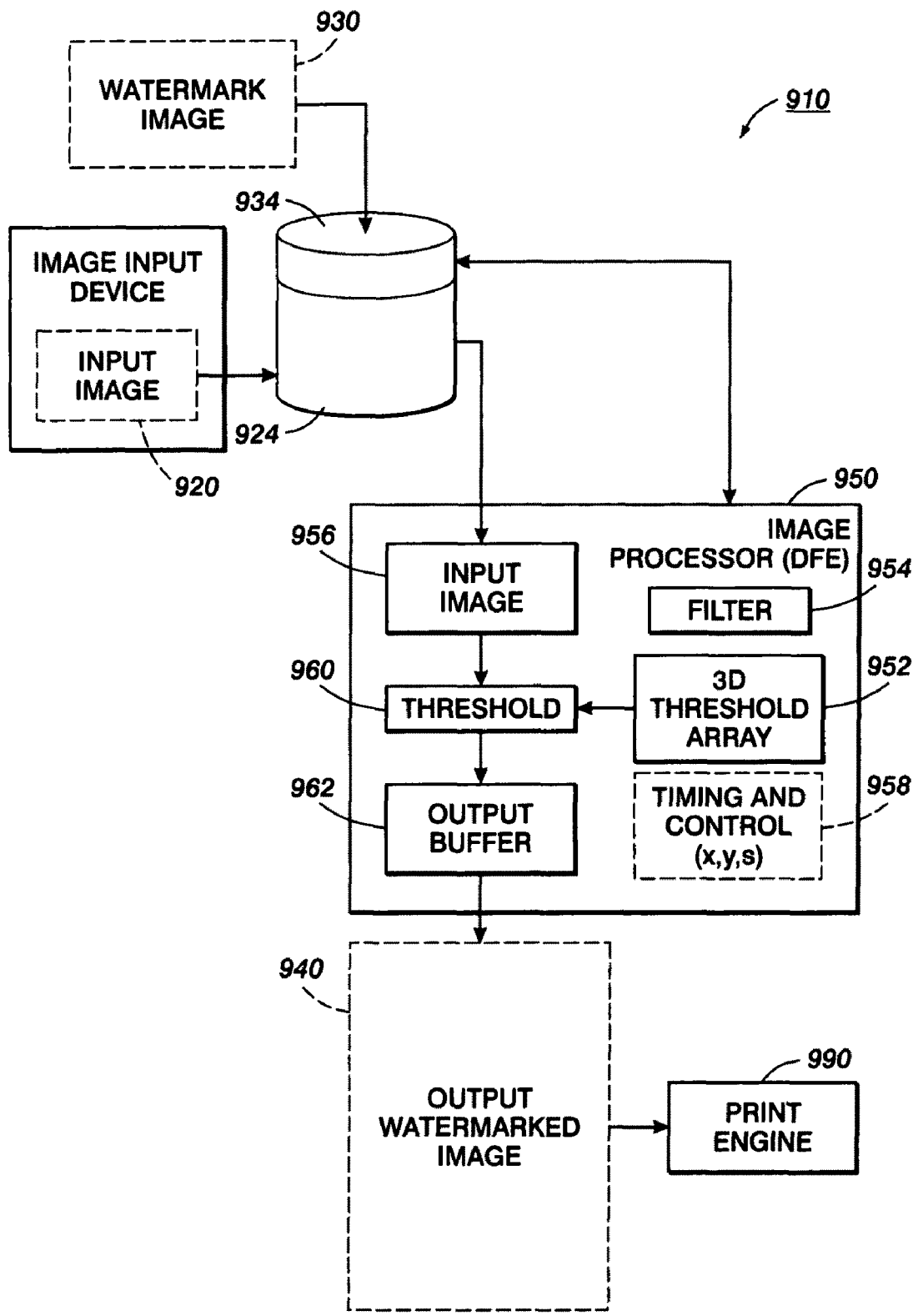
FIG. 9 is a block diagram depicting an embodiment of the system and related methods described herein.

Briefly, the watermark embedding process can be summarized as the series of steps generally illustrated in accordance with the block diagram of FIG. 9. FIG. 9 is an illustration of an exemplary image processing system 910, suitable for carrying on digital watermarking of an input image. The system 910 includes an image input device, as a source of an input image 920, such as a scanning device, a computer or image workstation for generating images, or a digital camera. The digital input image is at least temporarily or partially stored in an image memory 924. Memory 924, although depicted as a hard disk, may be any suitable media or installed circuitry including RAM and ROM, removable and permanent and various combinations thereof as are commonly known and used for the storage of digital data such as images. As will be further appreciated the memory 924 may be employed merely as a buffer just for the temporary storage of a portion of the image during processing as described herein.

Similarly, a watermark memory 934 is employed for storing a watermark 930 to be embedded in the watermarked output images to be created from the stored input image. System 910 further includes an image processor 950 or similar control and processing circuitry, such as a digital front end (DFE) known for use in the processing of digital images for rendering on printing engines and reprographic devices (e.g., Xerox® iGen3™, DocuColor™ and WorkCentre™ systems, etc.). The processor is employed for embedding a digital watermark 930 into the input image 920 to produce digitally watermarked output images 940, wherein the watermark is embedded into the image using a halftone structure having a first Rotation Angle to produce a first watermarked image and embedded into the image using a halftone structure having a second Rotation Angle to produce a second watermarked image. As will be appreciated the output images 640 may be rendered on any image output device such as a suitable marking or printing engine 990 capable of rendering grayscale output on one or more media.

First, system 910 generates three-dimensional (3D) threshold arrays 952 for all configurations with different Rotation Angles as described above, and stores the result into a memory. Alternatively, the threshold values for a plurality of given x, y and s values can also be calculated pixel-wise during the embedding process using Equation 2 above. Storing the pre-calculated result into the processor memory, in 3D threshold array 952 is intended for speeding up the halftone process. Accordingly, it will be appreciated that various halftone result generation and storage techniques may be employed in other alternative embodiments.

Next, for a given watermark pattern 930, a low-pass filter 954 may be applied to smooth out edges of the watermark image and the resultant image is then stored in memory as a multi-bit gray image (e.g., 8-bit), where the different gray levels represent different phase shifts for watermark embedding. If the original watermark pattern does not contain any high-frequency details this step may be omitted, if so desired.

The input image 920 and the processed watermark image obtained previously are then read in by the image processor 950 and a pixel-wise halftoning operation is conducted. In accordance with the disclosed embodiments, the three-dimensional threshold array 952, stored in memory accessible to the processor 950, is employed as an input to a threshold operation 956. In response to location coordinates x and y, the input value from the input image, and the threshold value determined by the coordinates x, y, and the phase shift s given by Equation 3, a resulting gray level g is determined for a plurality of coordinate locations to produce the processed watermark image 940.

As will be appreciated by those familiar with the design of image processing systems, the image processor 950 further includes timing and control operation block 958, which controls the flow of data and processing operations within the image processor, including any buffering of the image data as depicted in buffers 960 and 962. A wide variety of hardware may be employed to achieve the functionality depicted with regard to the image processor, including dedicated image processing chipsets and conventional computer workstations, as well as combinations thereof or other processing devices.

Once processed, the invisible digital watermark is embedded into the output images 940, wherein the watermark is embedded into each image at different Rotation Angles. The watermarked image containing the embedded invisible digital watermarks, is then provided as input to the printing engine 990 for rendering. A single public key can be used for retrieving the watermark from each watermarked image as described above, It will be appreciated that various of the above-disclosed embodiments and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A method creating digital watermarks in grayscale images, comprising:
receiving the first image to be watermarked;
determining the first watermark to be embedded in the first image;
embedding the first watermark into the first image by halftoning the first image using a three-dimensional threshold array having a phase shift value as an input and a first halftone structure defined by the spatial vectors $V_{a1}(x_{a1}, y_{a1})$ and $V_{b1}(x_{b1}, y_{b1})$;
outputting a first watermarked grayscale image containing the first digital watermark embedded with the first halftone structure;
receiving the second image to be watermarked;
determining the second watermark to be embedded in the second image;
embedding the second watermark into the second image by halftoning the second image with a three-dimensional threshold array having a phase shift value as an input and a second halftone structure defined by the spatial vectors $V_{a2}(x_{a2}, y_{a2})$ and $V_{b2}(x_{b2}, y_{b2})$, wherein the interior angle between the two vectors $V_{a1}(x_{a1}, y_{a1})$ and $V_{b1}(x_{b1}, y_{b1})$ of the first halftone structure is equal to the interior angle between the two vectors $V_{a2}(x_{a2}, y_{a2})$ and $V_{b2}(x_{b2}, y_{b2})$ of the second halftone structure, the vector amplitude $|V_{a1}(x_{a1}, y_{a1})|$ of the first vector of the first halftone structure is equal to the vector amplitude $|V_{a2}(x_{a2}, y_{a2})|$ of the first vector of the second halftone structure, and the vector amplitude $|V_{b1}(x_{b1}, y_{b1})|$ of the second vector of the first halftone structure is equal to the vector amplitude $|V_{b2}(x_{a2}, y_{b2})|$ of the second vector of the second halftone structure; and
outputting a second watermarked grayscale image containing the second watermark embedded with the second halftone structure.

2. The method defined in claim 1 further comprising:
creating a public key by using the first halftone structure defined by the spatial vectors $V_{a1}(x_{a1}, y_{a1})$ and $V_{b1}(x_{b1}, y_{b1})$ for retrieving the digital watermark from the first and second image prints.

3. The method defined in claim 2 further comprising;
retrieving the first digital watermark from the first watermarked image using the public key without rotation.

4. The method defined in claim 3 further comprising;
retrieving the second digital watermark from the second image print using the public key oriented with respect to the second watermarked image with a Rotation Angle equal to the angle between the first vector $V_{a1}(x_{a1}, y_{a1})$ of the first halftone structure and the first vector $V_{a2}(x_{a2}, y_{a2})$ of the second halftone structure.

5. The method defined in claim 1 wherein the embedding steps further comprise conducting pixel-wise haltoning of the image to be watermarked using the three-dimensional threshold array $$T(x,y)=128-127\cdot\{\cos[k\pi(x\cdot y_a+y\cdot x_a)+s]+\cos[k\pi(x\cdot y_b+y\cdot x_b)+s]\}/2$$

where s is the phase shift in radians.

6. The method defined in claim 5 wherein $s=g\cdot\pi/N$ where g is the gray level of the watermark and N is the total number of gray levels contained in the watermark.

7. The method defined in claim 1 wherein the spatial vectors $V_a(x_a, y_a)$ and $V_b(x_b, y_b)$ do not have to be defined by integers.

8. The method defined in claim 1 wherein the spatial vectors represent a 45 degree 106 LPI (line-per-inch) cluster screen for a 600 DPI (dot-per-inch) printer.

9. A method of creating a plurality of grayscale images each having a retrievable invisible digital watermark comprising:
receiving the grayscale image to be watermarked;
determining the grayscale watermark to be embedded in the image; and
creating a plurality of digital watermarked grayscale images by embedding a digital watermark into the image by halftoning the image with different halftone structures each defined by the spatial vectors $V_a(x_a, y_a)$ and $V_b(x_b, y_b)$ having the same interior angle $\alpha$, the same vector amplitudes $|V_a(x_a, y_a)|$ and $|V_a(x_a, y_a)|$, and a different Rotation Angle, wherein the watermark can be retrieved from the plurality of images using a single public key.

10. The method defined in claim 9 wherein the step of creating a plurality of digital watermarked images includes embedding the digital watermark into the image by halftoning the image using a three-dimensional threshold array having a phase shift value as an input value.

11. The method defined in claim 9 further comprising:
creating the single public key defined by spatial vectors $V_a(x_a, y_a)$ and $V_b(x_b, y_b)$ having the interior angle $\alpha$ and the same vector amplitudes $|V_a(x_a, y_a)|$ and $|V_a(x_a, y_a)|$ as the halftone structures used for embedding the digital watermark into the image.

12. The method defined in claim 11 further comprising:
retrieving the digital watermark from each of the digital watermarked images using the single public key.

13. The method defined in claim 12 wherein the retrieving step further comprises:
orienting the single public key with respect to the watermarked images at different Orientation Angles for retrieving the watermark.

14. The method defined in claim 9 wherein the spatial vectors represent a 45 degree 106 LPI (line-per-inch) cluster screen for a 600 DPI (dot-per-inch) printer.

15. The method defined in claim 14 wherein the halftone structures are defined by the spatial vectors $V_{a45}(5.657, 0)$ and $V_{b45}(0, 5.657)$ for a Rotation Angle of 45 degrees, $V_{a30}(1.464, 5.464)$ and $V_{b30}(-5.464, 1.464)$ for a Rotation Angle of 30 degrees, $V_{a15}(2.828, 4.899)$ and $V_{b15}(-4.899, 2.828)$ for a Rotation Angle of 15 degrees, and $V_{a0}(4, 4)$ and $V_{b0}(-4, 4)$ for a Rotation Angle of 0 degrees.

16. A system for digital watermarking of an image, comprising:
an input image source;
image memory for storing the input image to be watermarked;
watermark memory for storing the watermark to be embedded in the image; and
an image processor including a three-dimensional threshold array where at least one input thereto is a phase shift value for embedding an invisible digital watermark into the image by halftoning the image with the three-dimensional threshold array using a plurality of halftone structures each defined by the spatial vectors $V_a(x_a, y_a)$ and $V_b(x_b, y_b)$ having the same interior angle $\alpha$, the same vector amplitudes $|V_a(x_a, y_a)|$ and $|V_a(x_a, y_a)|$, and a different Rotation Angle to produce a plurality of digitally watermarked output images.

17. A method for retrieving a watermark image from a plurality of digitally watermarked grayscale images, each formed by halftoning an image with a halftone structure having a different arbitrary Rotation Angle comprising:
overlaying a single public key transparency having halftone frequencies and angles matching the halftone structure used for forming the plurality of digital watermarked grayscale images atop each of the watermarked images and orienting the key with respect to the watermarked images at Orientation Angles matching the Rotation Angles used for embedding the watermark image into the corresponding digitally watermarked images to retrieve the watermark image.

18. The method defined in claim 17 wherein the public key transparency includes a checkerboard pattern.

19. The method defined in claim 18 wherein the watermark image was embedded into the digitally watermarked images a using a three-dimensional threshold array having phase shift value as an input.

* * * * *